US006921518B2

(12) United States Patent
Johnston

(10) Patent No.: US 6,921,518 B2
(45) Date of Patent: Jul. 26, 2005

(54) CHEMICAL REACTOR

(75) Inventor: Anthony Johnston, New South Wales (AU)

(73) Assignee: Meggitt (UK) Limited, Dorset (GB)

( * ) Notice: Subject to any disclaimer, the term of this patent is extended or adjusted under 35 U.S.C. 154(b) by 551 days.

(21) Appl. No.: 09/769,583

(22) Filed: Jan. 25, 2001

(65) Prior Publication Data

US 2001/0020444 A1 Sep. 13, 2001

Related U.S. Application Data

(60) Provisional application No. 60/184,007, filed on Feb. 22, 2000.

(30) Foreign Application Priority Data

Jan. 25, 2000 (GB) .............................. 0001699
Jul. 13, 2000 (GB) .............................. 0017188

(51) Int. Cl.[7] ................................. F28D 1/00
(52) U.S. Cl. .................. 422/198; 422/200; 422/188
(58) Field of Search ............... 422/198, 188, 422/200, 187

(56) References Cited

U.S. PATENT DOCUMENTS

| 4,075,092 | A | | 2/1978 | White et al. |
| 4,101,281 | A | | 7/1978 | Pagani |
| 4,153,855 | A | | 5/1979 | Feingold |
| 4,190,079 | A | | 2/1980 | White et al. |
| 4,231,979 | A | | 11/1980 | White et al. |
| 4,714,592 | A | | 12/1987 | Zanma et al. |
| 4,903,755 | A | * | 2/1990 | Michelfelder et al. ......... 165/7 |
| 4,938,930 | A | * | 7/1990 | Shinkawa et al. .......... 422/197 |
| 5,180,480 | A | | 1/1993 | Manz |
| 5,193,611 | A | * | 3/1993 | Hesselgreaves ............. 165/165 |
| 5,494,641 | A | | 2/1996 | Krstanovic |
| 5,540,899 | A | * | 7/1996 | Koves ........................ 422/200 |
| 5,585,074 | A | | 12/1996 | Zardi et al. |
| 5,727,618 | A | | 3/1998 | Mundinger et al. |
| 5,744,100 | A | | 4/1998 | Krstanovic |
| 5,762,887 | A | | 6/1998 | Girod et al. |
| 5,804,701 | A | | 9/1998 | Berger |
| 6,200,536 | B1 | * | 3/2001 | Tonkovich et al. .......... 422/177 |
| 6,616,909 | B1 | * | 9/2003 | Tonkovich et al. ...... 423/648.1 |

FOREIGN PATENT DOCUMENTS

| EP | 0 386 693 | 3/1990 |
| EP | 0 386 692 | 6/1990 |
| EP | 0 539 834 | 10/1992 |
| FR | 2 773 726 | 7/1999 |
| WO | WO 95/01834 | 1/1995 |
| WO | WO 96/12316 | 4/1996 |
| WO | WO 96/39260 | 12/1996 |
| WO | WO 96/42004 | 12/1996 |
| WO | WO 98.32535 | 7/1998 |

OTHER PUBLICATIONS

D. Reay, "Learning from Experiences with Compact Heat Exchangers", Doc. No. XP–002167972, CADDETT Analyses Series No. 25, pp. 32–42, 85–86, 98, 141–142, and XI–XII (Jun. 1999).

* cited by examiner

Primary Examiner—Kiley S. Stoner
Assistant Examiner—Len Tran
(74) Attorney, Agent, or Firm—Boyle Fredrickson Newholm Stein & Gratz S.C.

(57) ABSTRACT

A reactor of the staged adiabatic reactor type, comprises at least one heat exchanger panel, preferably a printed circuit heat exchange (PCHE) panel, interposes between adiabatic beds of catalyst, wherein the facial area of the panels and the superficial facial area of the corresponding catalyst are substantially similar, and the panels include means defining discrete passages for handling of reactants and heat transfer media, wherein the means defining passages for heat transfer media provide for at least two differing flow path directions for the heat transfer media through the heat exchanger panel whereby the occurrence of temperature bias or differentials is reduced.

13 Claims, 9 Drawing Sheets

CHEMICAL REACTOR

CROSS-REFERENCE TO RELATED APPLICATIONS

This application claims priority under 35 U.S.C. §119(e) to U.S. Provisional Patent Application No. 60/184,007, entitled Catalytic Bed Reactor, filed Feb. 22, 2000, and under 35 USC §119(a) to G.B. 0001699.8, filed Jan. 25, 2000 and G.B. 0017188.4, filed Jul. 13, 2000, the entirety of each of which is incorporated herein by reference.

FIELD OF THE INVENTION

The present invention is applicable in the field of chemical engineering and especially relates to improvements in chemical reactors. In general the invention relates to control of the reactant temperature during an exothermic or endothermic reaction. Particularly the invention provides a printed circuit reactor (PCR) system and process control method wherein the reactant temperature profile at the exit of the heat exchanger panels is "flat", i.e. the reactant exit temperature across the width of the heat exchange panel is ideally uniform and as near to constant as possible.

BACKGROUND OF THE INVENTION

Control of the temperature of reactions within an acceptable range has been widely investigated and the chemical industry has devised several arrangements, those commonly used being discussed in standard references and texts, e.g. one might consider the general teachings by Octave LEVENSPIEL in Chapter 19 of Chemical Reaction Engineering (published by John Wiley & Sons).

The prior art includes a conventional reactor designed to offer more control over the reactant temperature and this is known as the staged adiabatic packed bed reactor. This system uses an arrangement wherein a number of discrete, spaced apart zones of reaction are provided with means therebetween to control the temperature of the products leaving a first zone of reaction prior to entering the next reaction zone. No heat exchanging means is provided to control the temperature of the reaction in the zones of the reaction. Thus the reactant fluid entering the reactor at a desired temperature passes through a packed bed containing catalyst. Upon exiting this first stage, the reactant gas and any products will have a temperature higher or lower than that of the initial temperature depending upon the reaction thermal characteristics. A heat exchanger then heats or cools the reactant gas to a second desired temperature, which may or may not be equivalent to the temperature of the first, before passing to the next packed bed i.e. the second stage. This sequence is repeated until the desired conversion is obtained. Thus the temperature profile of the reaction will be stepped within an acceptable range of temperature, and will therefore not be truly isothermal.

The heat exchanger panel of choice for the purposes of the invention is one formed from a plurality of plates superposed and diffusion bonded to form a stack of plates, wherein fluid passages are defined in said stack by virtue of a pre-treatment of said plates wherein each plate is selectively configured to provide channeled or blank surfaces according to the desired pattern of fluid passages by a treatment to remove surface material e.g. by chemical etching, hydraulic milling, or the like process to a desired depth. Optionally the chemical treatment may be augmented by a mechanical treatment using a suitable tool.

Such a pre-treatment of the plates is conducted in a manner analogous to manufacture of printed circuit boards (PCBs) and for this reason the heat exchanger design can be described as a printed circuit heat exchanger (PCHE). The application of the diffusion bonding technique for metal plates is well understood in the art of metal working and is applied for a variety of purposes e.g. in medical prosthesis manufacture.

This design of the PCHE has been proven by the designers of the proposed PCR system since 1985 when these compact heat exchangers were first introduced.

A PCR type of reactor was designed by the present applicants and is the subject of a separate patent application (GB. 0001699.8). Such a reactor is formed to provide at least one reaction zone, bounded by a heat exchanger formed from a plurality of plates superposed and diffusion bonded to form a stack of plates, wherein fluid channels are defined in said stack by virtue of pre-treatment of said plates wherein each plate is selectively configured according to the desired pattern of channels by a chemical treatment to remove surface material e.g. by chemical etching, to a desired depth. The fluid channels defined in the stack provide the opportunity to arrange for various reactant fluids to be conveyed in channels arranged in heat transfer relationship to discrete channels containing at least one auxiliary fluid for controlling the temperature of the reactants.

In order to maintain adequate control over a reaction, it is preferred that the reactant temperature profile at the exit of the heat exchanger panels is flat, since the reactants pass directly into the following adiabatic bed, without an opportunity to mix on a gross scale. If the reactants are too hot or too cold in places, the selectivity or conversion might well suffer. The issue assumes critical importance in strongly exothermic reactions, as thermal runaway can result if some of the reactants are not sufficiently cooled between reaction stages: higher temperatures result in higher reaction rates, which results in yet higher temperatures.

The heat transfer medium which carries the heat to or from the reactant can be fluids such as water, steam, molten salt, liquid metal, combustion gas or pressurised closed loop gas. When the reaction is near ambient temperature, then the provision of a large flow of heat transfer medium and the supply or extraction of heat from it may present few problems. It may simply be that water is used and the low grade heat either dumped in cooling towers, if the reaction is exothermic, or obtained from exhaust steam, if the reaction is endothermic. Alternatively, boiling or condensing water might be employed at higher temperatures.

However, more of a challenge arises when temperatures are extreme and the heat is more difficult to provide or sink, for example, if water is super-critical and so, depending on the exact situation, boiling and condensing cannot be used for isothermal heat addition or the temperature limits of the materials of construction are being approached or molten salts would degrade.

A typical example is the styrene reaction, which is an endothermic reaction for which the catalyst bed is ideally maintained in the vicinity of 600° C. In the PCR, this might entail allowing the reactant temperature to drop to about 580° C. in each adiabatic bed, with reheat to about 620° C. in each heat exchanger.

A suitable heat transfer medium is superheated steam at a temperature of 750° C. Ideally the outlet temperature of the steam from the heat exchangers would approach the reactant inlet temperature, in order to minimise the flow rate of the steam, and hence minimise the pipe sizes to carry it and the energy losses of its flow.

However, this introduces a severe potential problem: if the heat exchange between the steam, entering at 750° C.

and cooling towards the reactant inlet temperature, and the reactant, entering at 580° C., is not carefully managed then the temperature of the reactants exiting the heat exchanger will vary widely, even if the average reactant exit temperature is the required 620° C.

The problem is illustrated in FIG. 1 where, when there is a simple cross flow contact between the steam and the reactants it is noticeable that the higher reactant exit temperature is biased toward the end of the plate on which the steam enters. Furthermore, although an average temperature of 620° C. is produced, the variation in reactant exit temperature across the width of the heat exchange panel is approximately 580° C. to 720° C., a span of +/−70° C. This would be detrimental to the yield of the reaction.

An object of the invention is to obviate or mitigate problems of this nature. In particular it is an object of this invention to provide apparatus including a chemical reaction zone and a method of controlling the temperature of reactants to be reacted in such a zone.

SUMMARY OF THE INVENTION

Accordingly, the invention to be more particularly described herein provides a reactor broadly of the staged adiabatic reactor type, comprising at least one heat exchanger panel interposed between adiabatic beds of catalyst, wherein the facial area of the panels and the superficial facial area of the corresponding catalyst are substantially similar, and the panels include means defining discrete passages for handling of reactants and heat transfer media, wherein the means defining passages for heat transfer media provide for at least two differing flow path directions for the heat transfer media through the said heat exchanger panel whereby the occurrence of temperature bias or differentials is reduced.

Preferably the heat exchanger panel is entirely of the printed circuit heat exchanger type (PCHE), and at least two differing plate designs are used to make up the panel whereby substantial variation in flow path design is achievable. Primarily, the direction of flow of fluids in the PCHE panel is initially established by the respective feed and vent connections to inlet and outlet ports of the assembled PCHE plates constituting the panel. However by altering the "printed circuit" style design of the flow path in the plates, to provide differing PCHE plates within the panel, it is possible to control both flow path direction and influence rate of heat transfer.

Use of plates of differing design is a preferred option for flexibility in design choice, but in certain cases use of plates of substantially the same design can be adopted. In the special case of identical square plates juxtaposed in a stack, each having a particular pattern of passages etched out on the surface thereof, passages in different orientations can be defined by rotating alternate plates in the plane of the plate, and optionally interposing plates having no etched surfaces (blanks) where necessary to prevent intermixing of fluids. In this fashion, a succession of flow paths in differing directions can be achieved.

It will be understood that the plates having the appropriate channels defined by etching or the like are stacked and diffusion bonded together to form heat exchanger panels, and that such panels so formed can, if necessary, be juxtaposed and joined e.g. by welding to provide a larger panel of a desired height and width to match the required catalyst bed cross-sectional area. Use of blank (un-etched plates) is appropriate in some instances to complete a panel and close the open side of channels formed in an adjacent etched plate.

The reference to panels is for convenience and is not intended to indicate a dimensional limitation. However, it will be appreciated that the dimensions of the heat exchanger unit will vary according to a chosen reactor design, and that currently available manufacturing equipment may impose some practical limitations on panel size in one step. If it is desired to form relatively large size panels, such practical limitations can be readily overcome by juxtaposition of a plurality of panels of a size formed within the capacity of the available equipment and joining thereof by a suitable method such as welding. In this way a variety of shapes and sizes of the PCHE panel can be constructed.

Preferably also, the design of the plates is such that the passages defined by the printed circuit technique provide for the flow of the heat transfer media in more than one pass along the length of the plate in each direction. The flow path may be a serpentine path and optionally includes marked changes in direction to enhance turbulence in the flow of heat exchange media.

In a preferred aspect of the invention, the heat transfer media is contained in a header external to the heat exchange panel and operationally connected thereto to permit fluid flow. The arrangement of the headers with respect to the panel, preferably of the PCHE type, may involve partitions in particular locations in the headers to provide for distribution of heat exchange media to discrete heat exchanger panel passages, especially to separate inlets and outlets thereof, or in an alternative arrangement there is provided a manifold system distributing heat exchange media to and from ports formed directly within the peripheral edges of the panel, for example by forming, before assembly of the panel, apertures in corresponding plates, so that upon diffusion bonding thereof together, inlet and outlet chambers are created.

According to one aspect of the present invention there is provided apparatus of the staged adiabatic reactor type including a chemical reaction zone bounded by at least one surface including means for achieving heat exchange with fluids flowing via said zone to achieve a reaction, said zone and said surface at least in part being defined by a printed circuit heat exchange (PCHE) panel, said panel defining discrete passages providing for flow of fluid reactants and a heat transfer medium, wherein at least two different flow paths are defined by the PCHE plate design for handling the heat transfer medium, whereby said heat transfer medium is permitted to pass in at least two differing directions with respect to the flow of fluid reactants via the PCHE panel and thereby particularly provide for improved control of the reactant temperature profile of fluids passing out of the PCHE panel.

Preferably, the means for achieving heat exchange are entirely of the PCHE type described herein. Typically in such an arrangement, the heat transfer dimensions are smaller than catalyst particle dimensions, ensuring that the temperature profiles inherent in heat transfer to fluids in passages are not significant relative to the catalyst particle size. Also, the dimensions of the heat transfer are relatively small in comparison to the bed depth, so that any passage-scale temperature profiles occupy only a very small proportion of the individual catalyst bed lengths, e.g. typically up to about 200 mm. This contrasts significantly with the prior art use of exchanger tubes of say 25 mm outer diameter, which essentially cause downstream wakes in the temperature profiles which are then necessarily of a scale that is significantly larger than the individual catalyst particles and extend across at least a significant proportion of each catalyst bed.

Advantageously, the heat transfer medium makes more than one pass along the length of the plate in each direction.

Preferably also, the passages in which the heat transfer medium flows through comprise serpentine portions including a series of short sharp turns.

According to another aspect of the invention there is provided a process for performing chemical reactions under controlled temperature conditions, preferably in reactors of the staged adiabatic type, and comprising, delivery of fluid reactants successively via a chemical reaction zone to achieve a reaction and heat exchanger means, said zone being bounded by at least one surface including means for achieving heat exchange with said fluids, said surface at least in part being defined by a printed circuit heat exchanger (PCHE) panel providing means defining discrete passages providing for flow of a heat transfer medium therein, and further passages providing for flow of reactant fluids, introducing heat transfer medium to said PCHE panel, and causing same to pass in at least two differing directions with respect to the flow of fluid reactants via said PCHE panel to provide for improved control of the reactant temperature profile of fluids passing out of the PCHE panel.

According to the invention, several variants of the process of temperature control are possible, same being selected according to the choice of the operator having regard to the chemical reaction system at hand. The principal variable aspects of the PCR system to be considered for the purposes of temperature control include (a) direction of flow of heat exchange medium (HE) with respect to direction of flow of chemical reactants (CR) which are essentially, co-flow (same bulk flow direction), cross-flow (oblique or transverse to axial direction of bulk CR flow), counter-flow (HE bulk flow opposite to axial CR bulk flow), (b) number of passes of one with respect to the other (HE:CR), (c) direction of flow of HE in one PCHE plate exposed to a corresponding plate conducting CR with respect to direction of flow of HE in another PCHE plate also exposed to that CR conducting plate, and (d) number of differing PCHE plate designs incorporated into the PCHE panel. The opportunity to employ more than one heating or cooling fluid in a single panel—either in separate circuits on one plate or in separate plates is also available.

Excellent reactant exit temperature profiles across the heat exchanger are achievable when the HE flow in one PCHE plate juxtaposed to a plate having fluid-carrying passages in fluid-communication with a CR reaction zone corresponds in a complementary manner to the HE flow in another PCHE plate also arranged in a heat transfer relationship to that plate in fluid-communication with the CR reaction zone, e.g. on an opposite side thereof from the first such PCHE plate, and the HE bulk flow path is generally cross-flow i.e. at a tangent or an oblique angle to the CR bulk flow path, using multiple passes for the HE flow path. An example of this would be the three-pass two way co-flow illustrated in FIGS. 6 and 8. Less favourable but acceptable results for some reaction systems are achievable in arrangements such as illustrated in FIGS. 3 and 5. Poor operational systems are represented by the systems illustrated in FIGS. 1, 2 and 4.

According to another aspect of the invention, a PCHE plate design consists of multiple flow passages following serpentine paths essentially in parallel and exhibiting sharp changes in direction within the serpentine path e.g. by having a zig-zag pattern imposed upon substantially the whole length of each individual passage. The number of serpentine turns in each path is variable but at least 2 turns are needed to provide a return pass and an exit pass. The use of a zig-zag design is an optional feature. Primarily the advantage of the convoluted flow passage arrangement lies in providing a fluid path flow length which is an even or non-integral multiple of the flow length, permitting a better match of heat transfer and pressure drop requirements.

Such a plate may be matched with a corresponding plate of a complementary design mirroring the former to form a pair of plates between which a plate of a design suitable for conveying reactant fluids is located. Baffles may be provided at either end of the paired plates.

DESCRIPTION OF THE DRAWINGS

The invention will now be further explained in more detail by way of a few non-limiting embodiments described by way of example only with reference to the accompanying drawings in which.

MODES FOR CARRYING OUT THE INVENTION

An improved catalytic reactor system is obtainable according to the invention by use of PCHE panels arranged therewith to obtain a substantially flat reactant temperature profile upon exit from the PCHE in comparison with prior art systems as will be described below, particularly with reference to the preferred embodiment of FIG. 6.

In this discussion, for convenience, designs in which the heat transfer medium enters at both sides of the PCHE panel are called "two-way" designs, and those in which the heat exchange medium enters only at one end of the PCHE panel are termed "one-way" designs.

Figure 6:
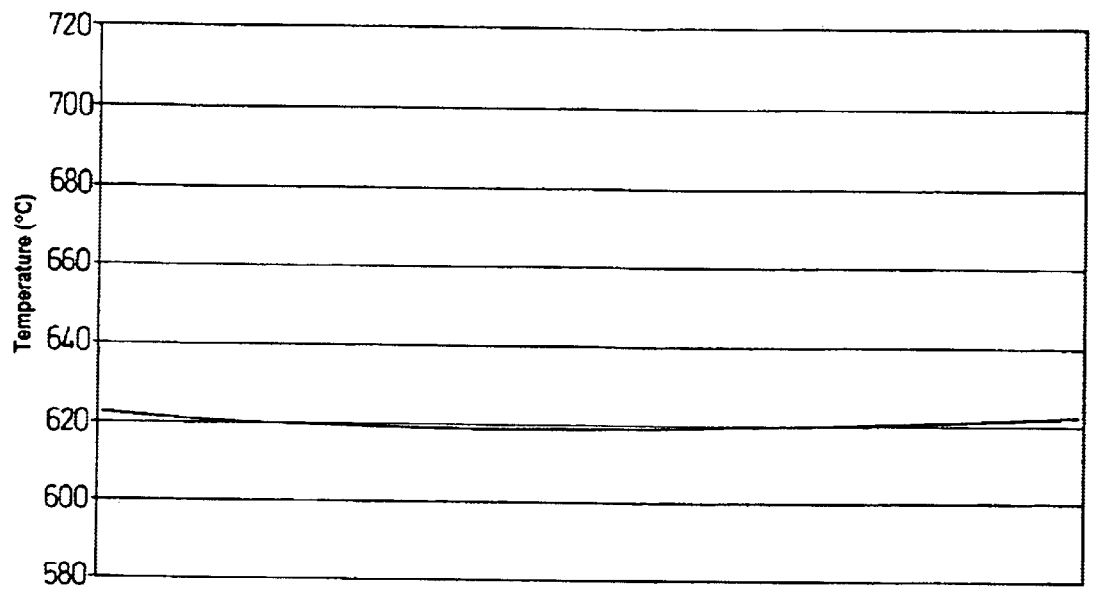
FIG. 6 indicates graphically at the upper part thereof the typical exit temperature profile across a further improved and preferred heat exchanger system shown schematically in the lower part of the figure in overlay plan as in use and separated (again in plan) for clarity in identifying the discrete passages for flow.
Figure 6:
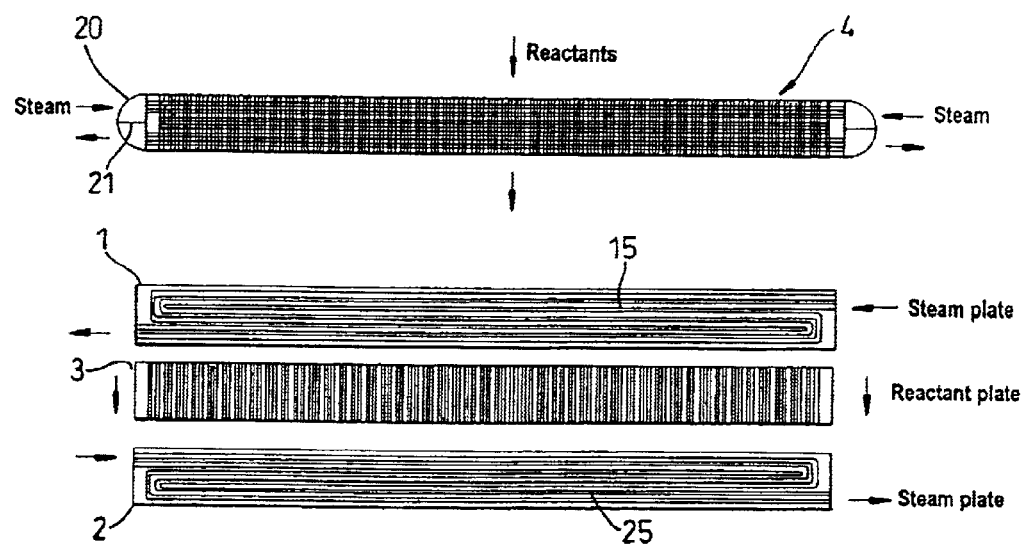
Figure 7:
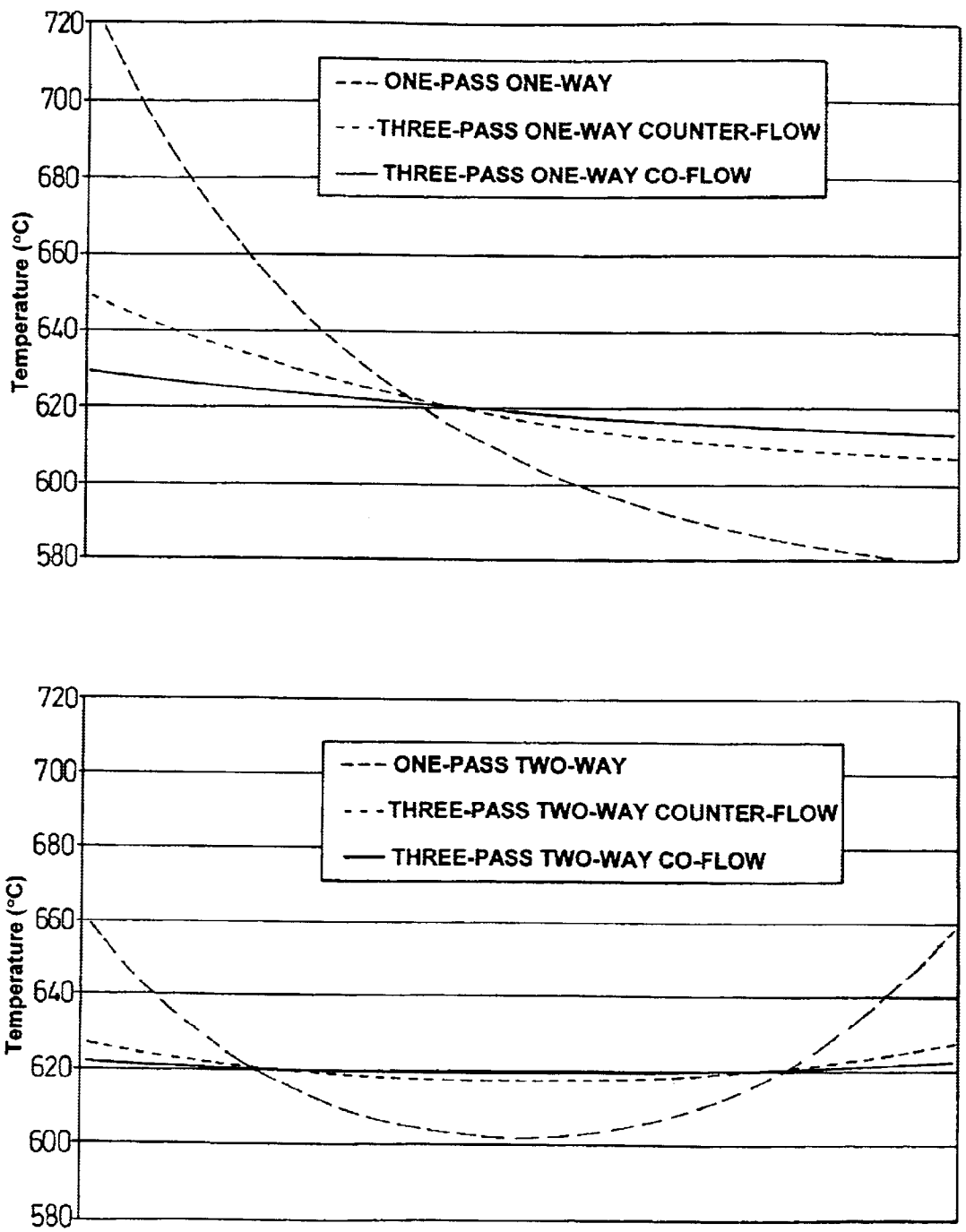
FIG. 7 shows an overview for comparison purposes of the differing reactant exit temperature profiles achievable by altering the flow of heat exchanger paths with respect to reactant flow.

FIG. 6 (lower part) illustrates schematically an arrangement for a PCHE panel 4 made up of plates for receiving heat exchange medium, here steam, of differing design 1, 2 each arranged either side of a reactant fluid-flow plate 3, firstly as the plates would be arranged in use and below that representation, with the plates separated for clarity in illustration of the respective flow paths. At either end there is a semi-cylindrical header 20 external to the plates with partitions 21 to separate steam inlet and outlet at each plate end. The arrows signify the intended direction of flow for the steam or the reactant.

The plates are designed to provide serpentine passages 15, 25 permitting multiple passes of steam across the plates, thereby increasing flow path length with respect to the width of the plate and improving the heat transfer with the reactants passing therebetween.

In use thereof, fluid reactants to be heated or re-heated are introduced to the PCHE panel, where steam enters the bottom steam plate 2 at the left end and exits at the right end thus flowing through the plate in the direction of the arrows. The top plate 1 has the steam enter at the right and flow to the left end, in a complementary fashion to flow in the bottom plate. As the reaction in the adjacent reaction zone is endothermic the emergent reactant fluids pass into the PCHE panel and cause the steam to cool as it flows through the plate 1. The temperature profile of the emergent reactant fluids is substantially symmetrical due to the interaction of the reactant fluids with heating fluid (steam) in both directions on each side of the plate, and thus is more favorable in comparison to the one way contact PCHE of FIG. 1.

The process is thus improved whenever the steam is "multi-passed", across the path of the reactants, that is passed more than once, back and forth on the same plate. PCHE panels can easily employ on-plate multi-passing, as complex channel arrangements are easily produced by the photo-chemical machining process FIG. 6 shows such an arrangement with the steam passing three times on each of the steam plates. The steam on the top plate 1 passes right to left twice and left to right once while on the complementary bottom plate 2 the opposite is true, which therefore, means that the reactant exit temperature profile across the PCHE panel is substantially uniform as illustrated in the plot of the temperature profile. Thus the combined effect of the plates provides a temperature profile for the reactants upon exit from the PCHE panel that is substantially flat and symmetrical, the temperature variance being only a negligible +/−1.6° C. span.

Figure 5:
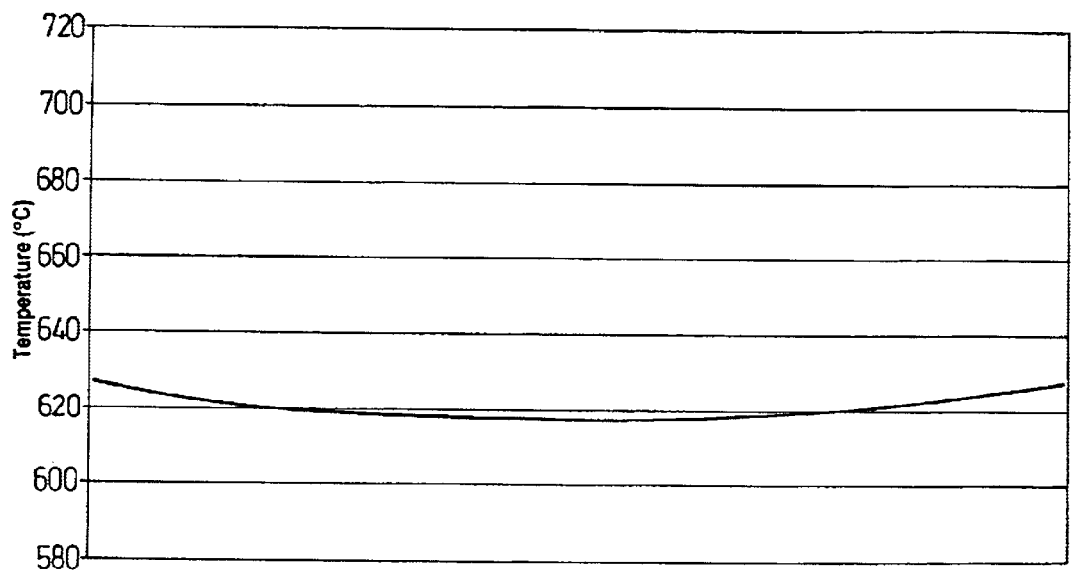
FIG. 5 indicates graphically at the upper part thereof the typical exit temperature profile across an improved heat exchanger system shown schematically in the lower part of the figure in overlay plan as in use and separated (again in plan) for clarity in identifying the discrete passages for flow.
Figure 5:
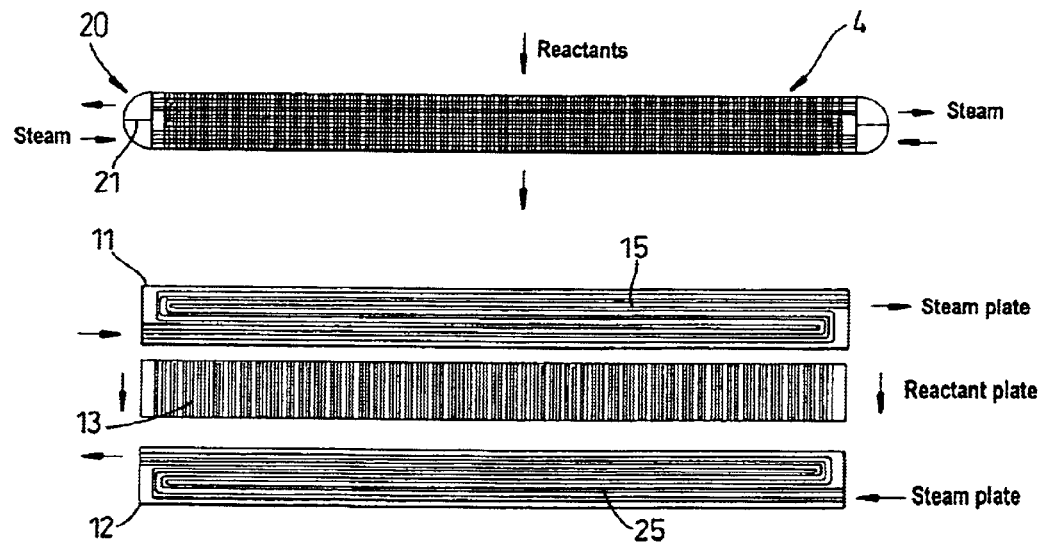

A variant of that arrangement is shown in FIG. 5, with the steam again passing three times on each of the steam plates. Here, the steam on the top plate 11 enters the plate adjacent to the output side of the reactant fluid flow plate 13 and passes left to right twice and right to left once and exits adjacent to the input side of the reactant fluid flow plate. Likewise, on the bottom plate 12 the steam flow path is such that steam enters the plate 12 adjacent the output side of the reactant fluid flow plate, passes three times across the plate 12 and exits adjacent the input side of the reactant fluid flow plate 13. Therefore, again it is still possible to obtain a reactant fluid exit temperature profile across the PCHE panel, shown in FIG. 5, that is also a symmetrical curve. The diagonally opposed (w.r.t. steam input) multi-passing however has produced a profile wherein the temperature span is only ±5° C.

Figure 4:
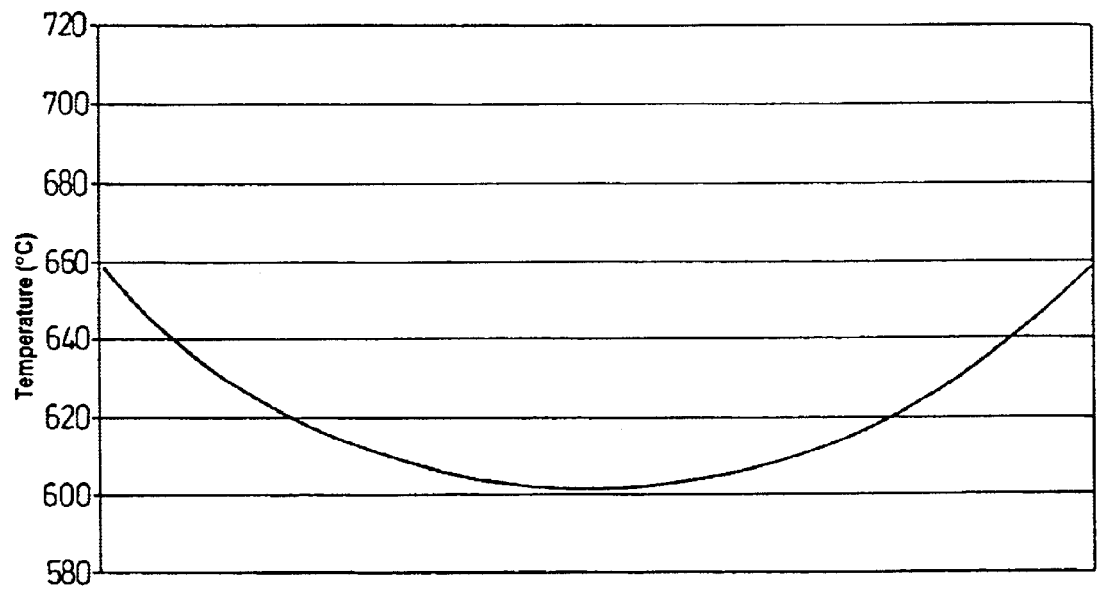
FIG. 4 indicates graphically at the upper part thereof the typical exit temperature profile across a 2-way heat exchanger system of the single pass type shown schematically in the lower part of the figure in overlay plan as in use and separated (again in plan) for clarity in identifying the discrete passages for flow.
Figure 4:
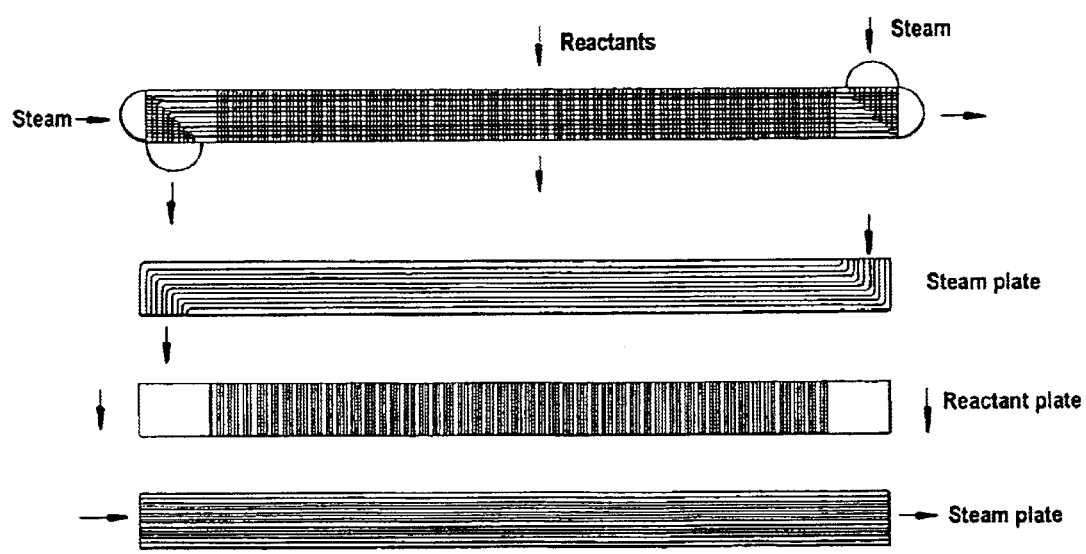

A much simpler arrangement, is shown in FIG. 4, wherein there is a single pass of steam on each steam plate. In such a single pass design steam flows are separated by turning the flow on one of the steam plates through 90 degrees at each end of the plate. In order to keep all passages the same length, the passages turn up at one end and down at the other.

Figure 1:
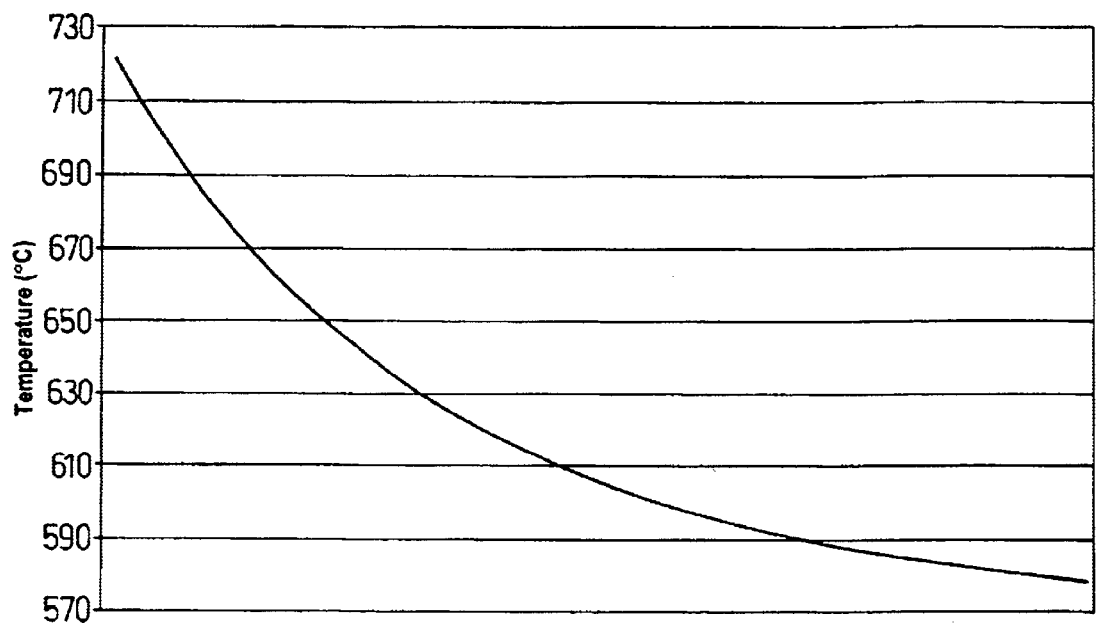
FIG. 1 indicates graphically at the upper part thereof the typical exit temperature profile across a heat exchanger system of the prior art single pass cross-flow type shown schematically in the lower part of the figure in overlay plan as in use and separated (again in plan) for clarity in identifying the discrete passages for flow.
Figure 1:
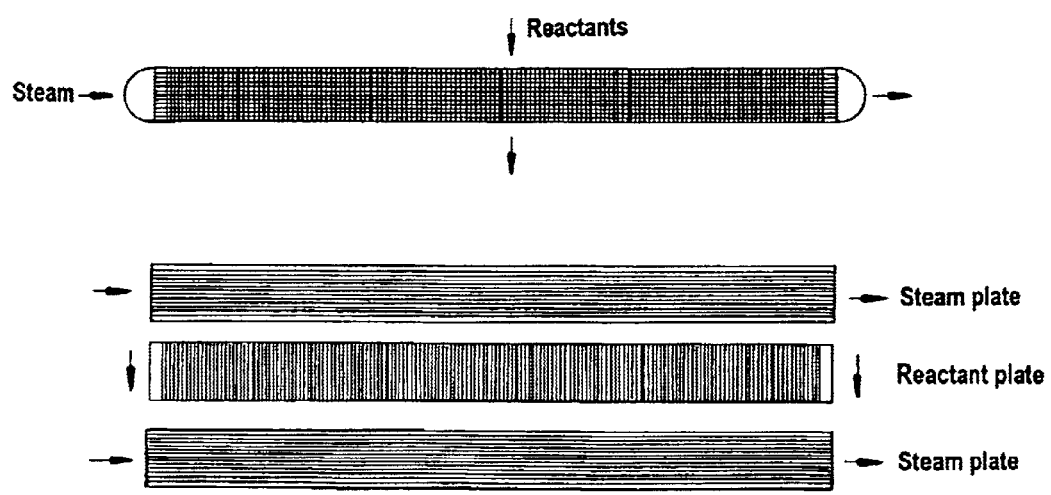
Figure 2:
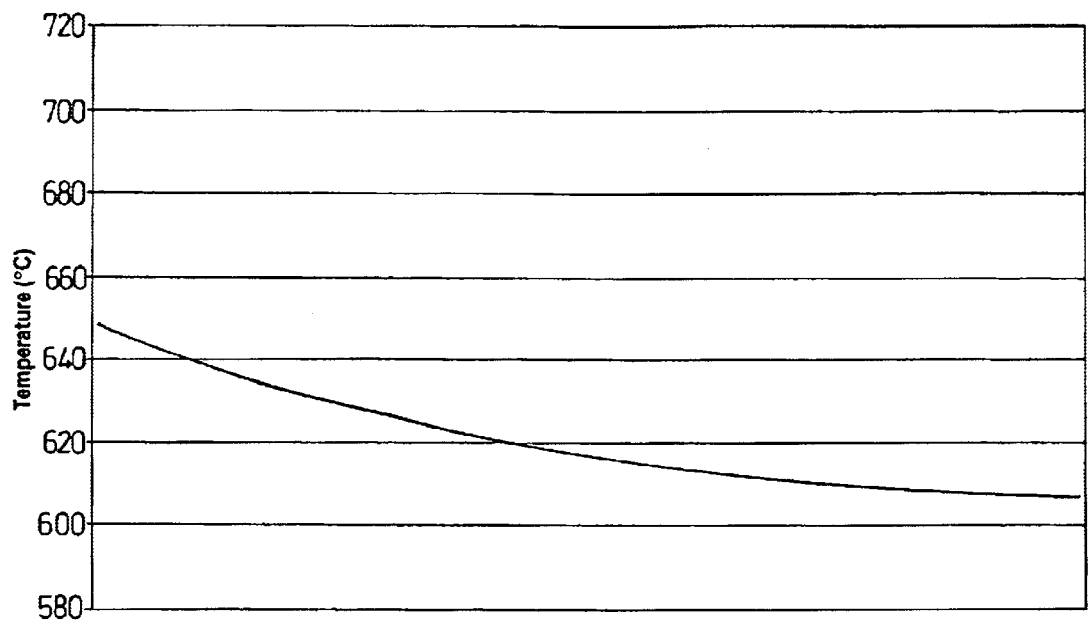
FIG. 2 indicates graphically at the upper part thereof the typical exit temperature profile across an improved heat exchanger system shown schematically in the lower part of the figure in overlay plan as in use and separated (again in plan) for clarity in identifying the discrete passages for flow.
Figure 2:
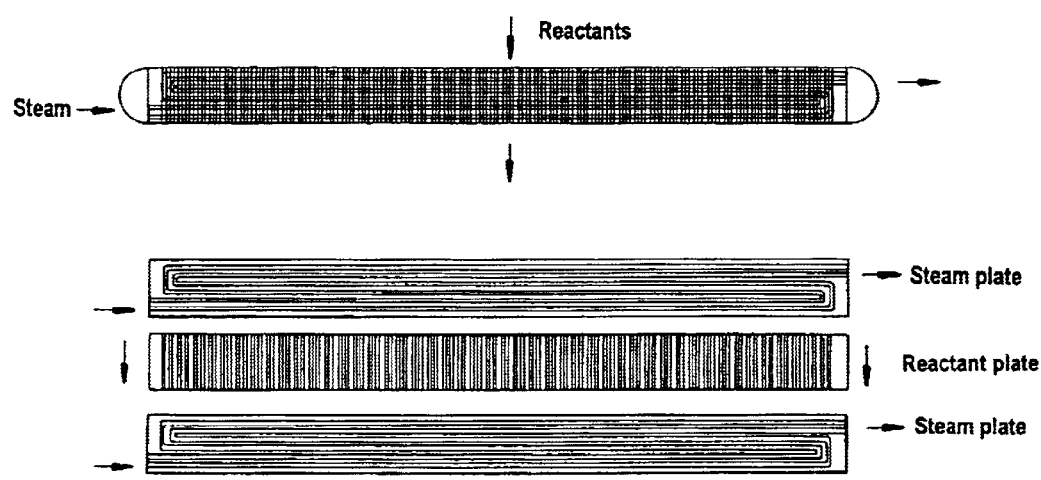
Figure 3:
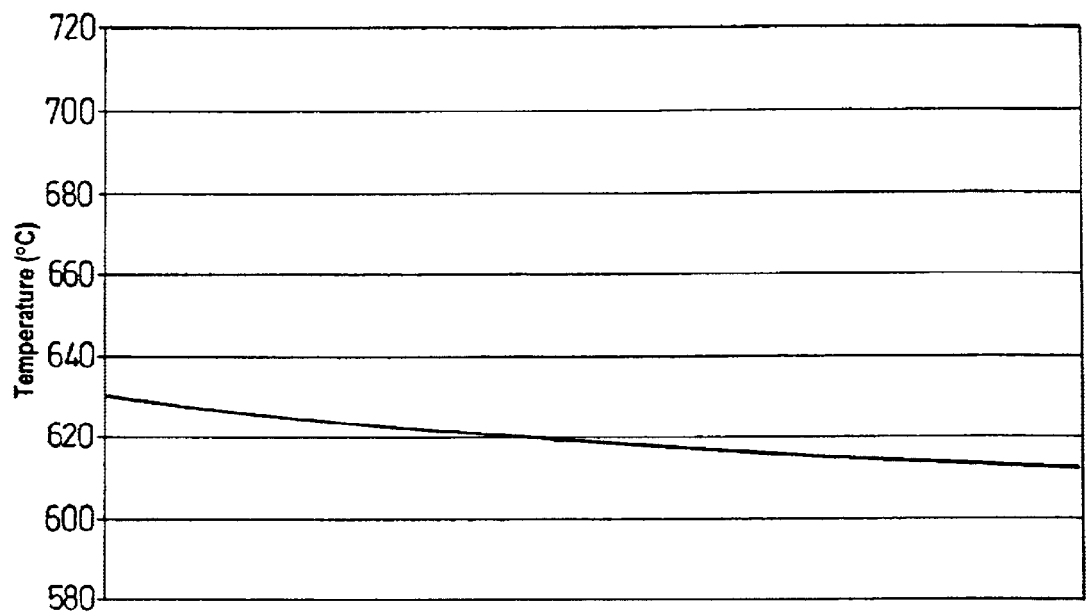
FIG. 3 indicates graphically at the upper part thereof the typical exit temperature profile across an alternative improved heat exchanger system shown schematically in the lower part of the figure in overlay plan as in use and separated (again in plan) for clarity in identifying the discrete passages for flow.
Figure 3:
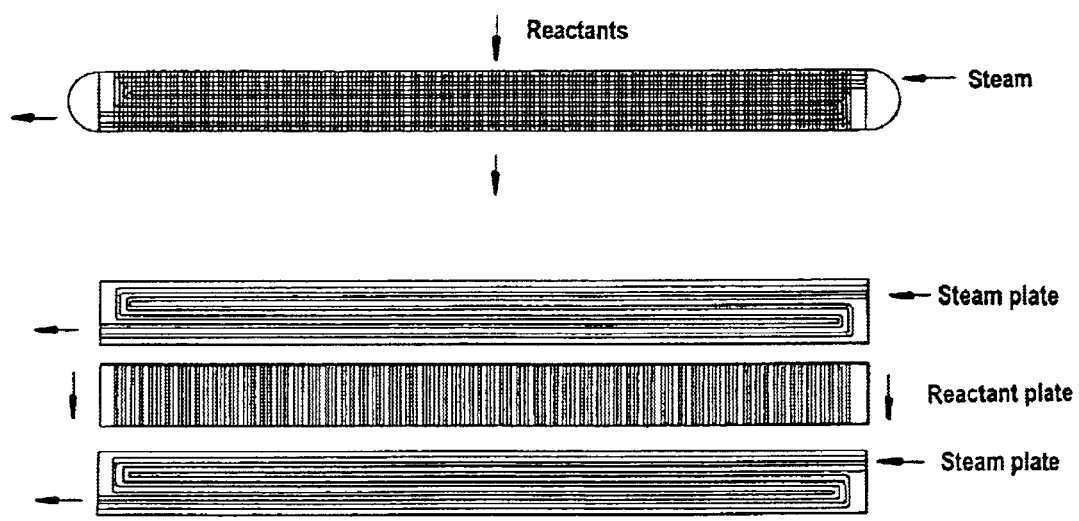

The temperature plot in the upper part of FIG. 4, shows that even in this arrangement a significant improvement over the arrangement of FIG. 1 is achievable in that it is possible to reduce the inlet to outlet temperature span from ±70° C. (as per FIG. 1) to ±29° C.

Figure 8:
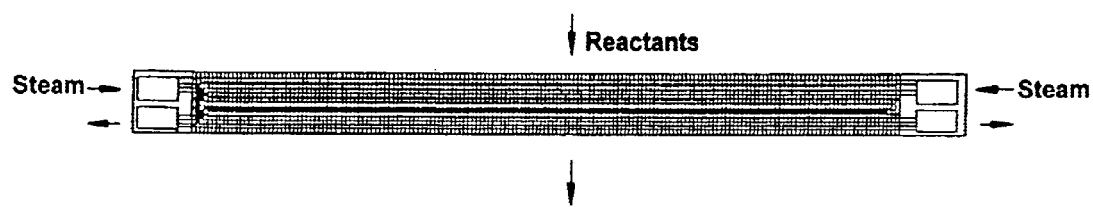
FIG. 8 illustrates schematically a preferred arrangement for a plate design incorporating inlet and exit ports in the peripheral edges of the plate.
Figure 9:
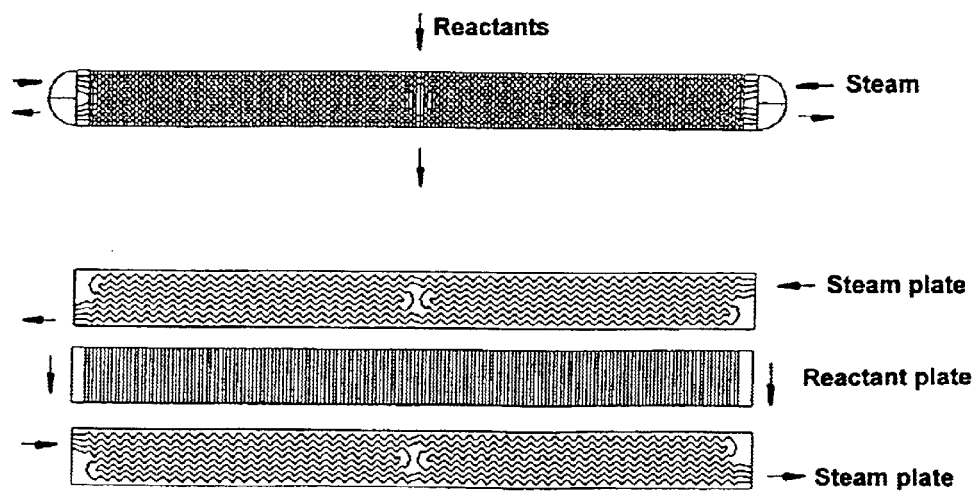
FIG. 9 illustrates a preferred heat exchange medium flow passage arrangement involving two separate optional features, non-odd total pass length by use of serpentine parallel flow passages and turbulent flow-inducing zig-zag changes in direction of the discrete flow passages.

Alternative embodiments, each improved in certain aspects, are shown in FIGS. 8 and 9. FIG. 8 shows a ported style of plate construction whereby apertures 7 are formed in the plates, to create inlet 8 and outlet 9 chambers within the panel when the plates are diffusion bonded together.

Another improvement is the adoption of zig-zag passages 10 as illustrated in FIG. 9 which have the advantage of inducing turbulence and thereby improving heat transfer. Also, it is possible for the passages to have a length which is an even or a fractional multiple of the plate length, and still have the steam enter at one end and leave at the other, and have the same length as each other.

Figure 10:
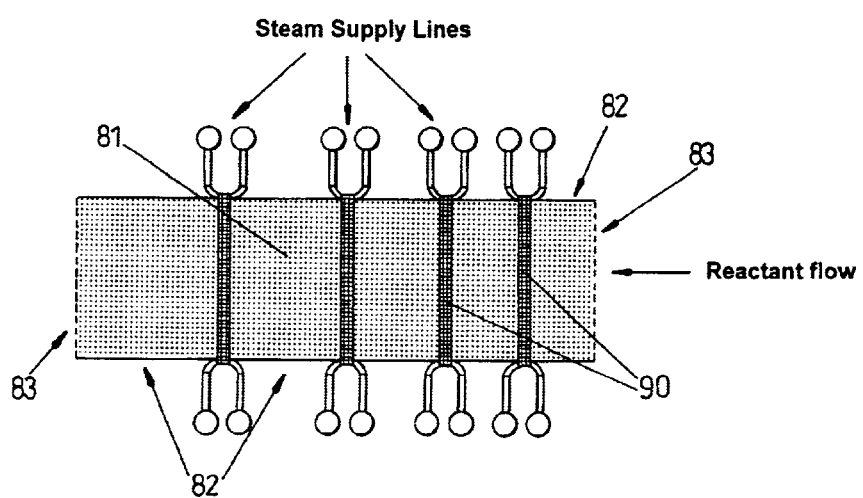
FIG. 10 illustrates a preferred printed circuit reaction (PCR) system shown in plan and comprising a succession of packed catalyst beds with a succession of printed circuit heat exchanger (PCHE) panels interposed therebetween to provide a series of catalytic chemical reaction zones alternating with a series of temperature control zones, suitable for example for use in the styrene production process.

A novel adiabatic catalyst bed reactor system (as illustrated in FIG. 10) for conducting a chemical reaction process comprises a series of catalytic reaction zones 80, consisting of packed catalyst beds 81 confined within reactor containment upper and lower wall panels 82 and catalytic reactor zone end walls in the form of mesh 83. The mesh acts to resist migration of catalyst out of the bed under the influence of bulk fluid flow that would otherwise carry catalyst particles down stream of the catalytic reactor system. These catalytic reactor zones are arranged in succession and have interposed therebetween, PCHE panels 90 in fluid communication with the catalyst beds for receiving mixed reactants for the purposes of thermally conditioning same before entry to the next stage of the process. Each PCHE panel consists of a plurality of PCHE plates suitably ported and provided with serpentine passages to permit two-way, three-pass heat exchange contact with the reactants to be conditioned. The PCHE panels are connected to external steam manifolds for appropriate supply and venting of steam as the heat exchange medium (HE).

Although not specifically shown as such in FIG. 10, the panels may be of differing design in terms of bore of serpentine passages for throughput of HE, surface area of heat transfer surfaces etc. to accommodate process needs as the reaction develops through the catalytic reactor as a whole, particularly to adjust to match any changes necessary in the catalyst bed.

In use the reactants, say to produce styrene (an endothermic reaction), are introduced, ideally at a temperature of about 600° C. or above, to the first catalytic bed 81 which is appropriately sized to suit the desired flow rate and ensure an adequate total bulk throughput flow. A certain heat demand on the reaction may result in the reactants and partial product mixture exiting the first catalytic bed at a less than optimum temperature, say about 580° C. Accordingly the first PCHE panel 90 is designed to received superheated steam at a temperature of up to about perhaps 800° C. with the objective of achieving a re-heat of the reactant partial product mixture up to about 620° C. before it enters the next catalytic bed. These steps are repeated successively for each stage of the catalytic reactor.

INDUSTRIAL APPLICABILITY

The PCHE plate designs, PCHE panels, PCR catalytic systems, and process for performing chemical reactions under controlled temperature conditions according to the invention as disclosed herein find utility in the field of chemical engineering and are useful in a wide range of industrial scale chemical reactions but may be adapted for smaller scale e.g. laboratory and pilot plant work.

What is claimed is:

1. A reactor of the staged adiabatic reactor type, comprising:
   (a) adiabatic beds of catalyst each including at least one catalyst and that receive reactants for reaction purposes;
   (b) at least one printed circuit heat exchange (PCHE) panel interposed between the adiabatic beds of catalyst that receives reactants for heat exchange purposes, wherein a facial area of the heat exchanger panel and a superficial facial area of the catalyst are substantially similar, wherein the heat exchanger panel includes discrete passages for handling reactants and heat transfer media, respectively, and wherein the passages for heat transfer media permit at least two differing flow path directions for the heat transfer media through the heat exchanger panel.

2. A reactor according to claim 1, wherein the PCHE panel is comprised of a plurality of plates are superposed and diffusion bonded to form a stack of plates to form the PCHE heat exchange panel, wherein fluid passages are defined in the stack by virtue of a pre-treatment of the plates, and wherein each plate is selectively configured to provide either channeled surfaces or blank surfaces in order to obtain a desired pattern of fluid passages in the heat exchanger.

3. A reactor according to claim 2, wherein channels are formed by removal of surface material from the plate.

4. A reactor according to claim 2, wherein at least one plate includes a passageway in which a heat exchange medium can flow in a first direction and at least one plate includes a passageway in which a heat exchange medium can flow in a second direction that is opposite the first direction.

5. A reactor according to claim 2, wherein plates of substantially the same shape are juxtaposed in a stack, each plate having a particular pattern of passages etched out on a surface thereof, and wherein passages in different orientations are defined by alternate alignment of successive plates by rotation of the respective plate in the plane of the plate.

6. A reactor according to claim 2, wherein plates lacking channelled surfaces are incorporated in the heat exchanger panel to prevent intermixing of fluids.

7. A reactor according to claim 1, further comprising a chemical reaction zone bounded by at least one surface including a heat exchanger that permits heat exchange with fluids flowing through the zone to achieve a reaction, the zone and the surface at least in part being defined by a printed circuit heat exchange (PCHE) panel, the heat exchange panel defining discrete passages providing for flow of fluid reactants and a heat transfer medium, respectively,
   wherein at least two different flow paths are defined in the plate for handling the heat transfer medium, and
   wherein the heat transfer medium is permitted to pass in at least two differing directions through the fluid flow passages with respect to the flow of fluid reactants through the fluid flow passages.

8. A reactor according to claim 7, wherein the fluid flow passages are configured to cause heat transfer medium flowing therethrough to make more than one pass along the length of the plate.

9. A reactor according to claim 8, wherein the fluid flow passages comprise serpentine portions including a series of short, sharp turns.

10. A reactor according to claim 7, wherein the fluid flow passages comprise a zig-zag pattern imposed upon substantially the whole length of each individual passage.

11. A process for performing chemical reactions under controlled temperature conditions, the process comprising:
    (a) delivering reactant fluids successively through a chemical reaction zone to achieve a reaction and through a heat exchanger that bounds the chemical reaction zone and that allows heat exchange between the reactant fluids and a heat transfer medium, the heat exchanger at least in part being defined by a printed circuit heat exchange (PCHE) panel providing (1) passages providing for flow of the heat transfer medium therein and (2) passages providing for flow of the reactant fluids therein;
    (b) introducing the heat transfer medium to the PCHE panel; and
    (c) causing the heat transfer medium to pass in at least two differing directions through the passages in the PCHE panel with respect to the flow of fluid reactants through the passages in the PCHE panel.

12. A reactor according to claim 2, wherein at least two differing plate designs are used to make up the panel.

13. A reactor according to claim 10, wherein the catalyst bed includes a catalyst comprising one of spherical bodies, cylindrical bodies, hollow bodies, solid particles, expanded particles, pourous solids, wire mesh coated matrix catalyst, and woven gauze coated matrix catalyst.

* * * * *